United States Patent Office 3,610,108
Patented Oct. 5, 1971

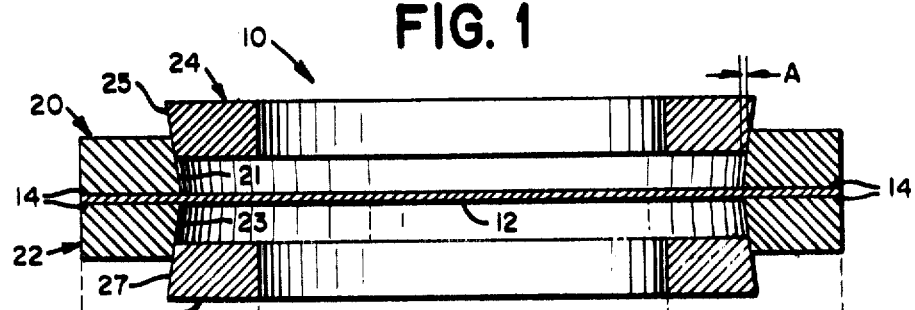
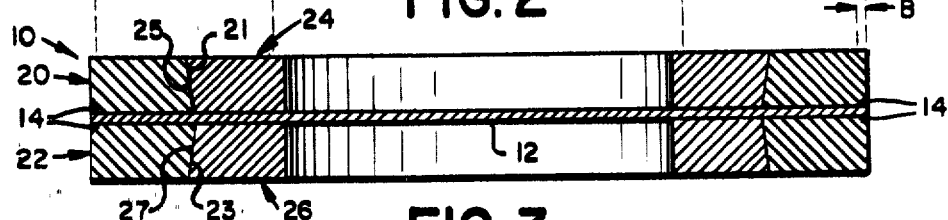
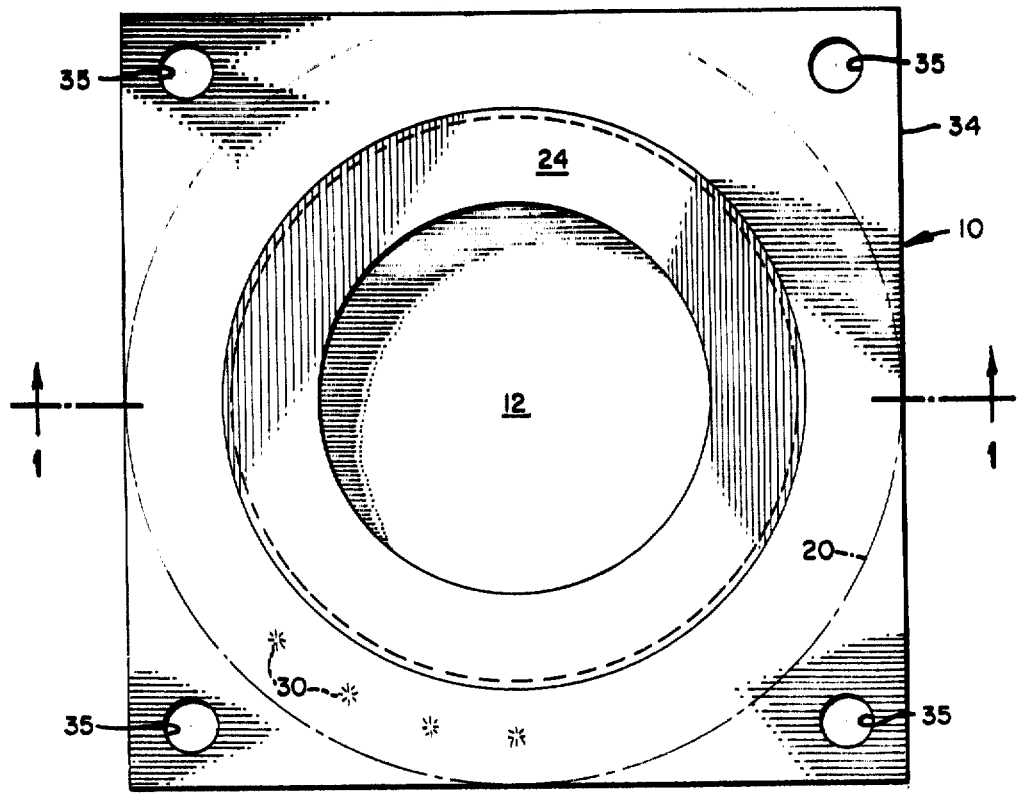
INVENTOR
JOHANNES SORTEBERG
BY
*MATTERN WARE & DAVIS*
ATTORNEYS

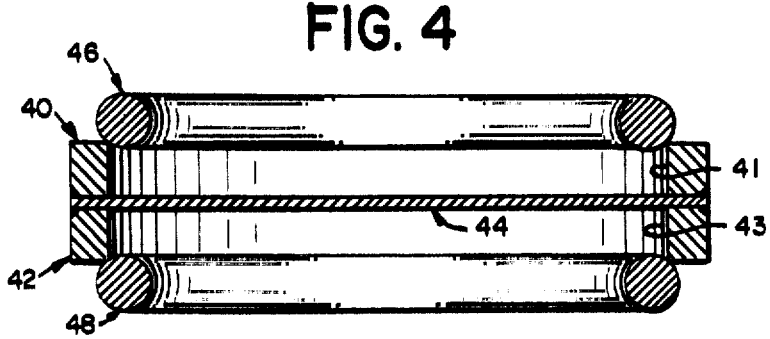
FIG. 4
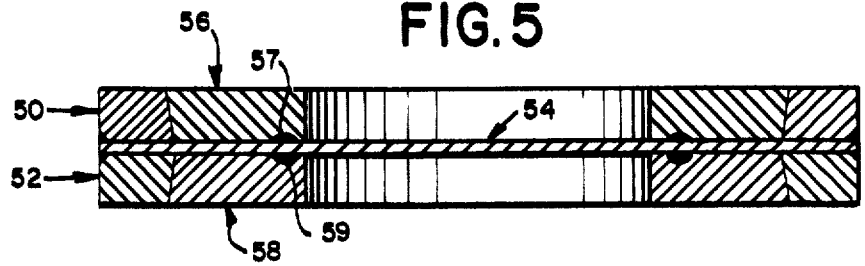
FIG. 5
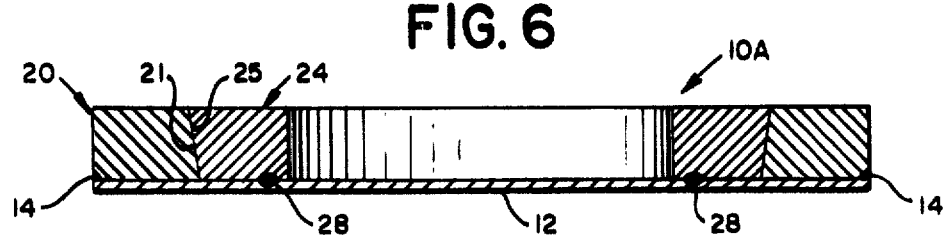
FIG. 6
FIG. 7
FIG. 8
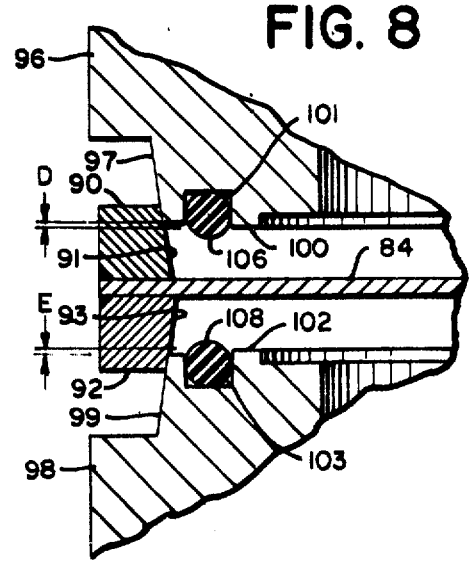

3,610,108
PRESTRESSED PRESSURE RESPONSIVE DIAPHRAGMS AND METHODS FOR MAKING THE SAME
Johannes Sorteberg, Darien, Conn. (% Sorteberg Controls Corp., 540 Connecticut Ave., South Norwalk, Conn. 06854)
Filed Oct. 6, 1969, Ser. No. 864,120
Int. Cl. F16j 3/00
U.S. Cl. 92—98                                    11 Claims

ABSTRACT OF THE DISCLOSURE

A prestressed diaphragm assembly is formed by welding the peripheral edge of a diaphragm to a metal ring to form a closed flange. The flange is then permanently tensionally stressed by forcing inside the flange a ring having an unstressed outside diameter slightly larger than the unstressed inside diameter of the flange, thereby simultaneously imparting a stressed condition to the flange and diaphragm. Various configurations and combinations of stressing flanges and rings are disclosed. A prestressed diaphragm assembly constructed according to this method is biased to a single neutral position, assuring more accurate response to small variations of pressure, assuring return to the original neutral position when pressure is removed, and eliminating buckling or the so called "oil can" effect.

SUMMARY OF THE INVENTION

The invention relates to a method of prestressing diaphragms and the resultant prestressed diaphragm assemblies. More particularly, it relates to a method of prestressing metal diaphragms and the resultant assemblies for use in pressure responsive devices such a pressure, vacuum, or differential pressure transmitters or gauges.

Construction of devices which are accurately responsive to small variations in pressure requires prestressed diaphragms to eliminate buckling or the "oil can" effect. This undesirable effect is present in unstressed diaphragms because there is always some slack or excess material in certain portions of the diaphragm. A minute amount of pressure will move the diaphragm through a plurality of relatively stable positions within the limits of the excess material. The movement or displacement of the diaphragm in response to a small amount of pressure is, therefore, often excessively high and unrelated in any predetermined way to the amount of pressure present. Upon removal of pressure from an unstressed diaphragm, it will not return to a consistent neutral position, thereby further complicating problems of calibration and correlation of diaphragm movement to pressure.

A prestressed diaphragm has no slack as is found in unstressed diaphragms and is biased toward a single neutral position. Thus, a prestressed diaphragm is highly desirable for use in pressure sensitive devices.

It is therefore an object of the invention to prestress diaphragms.

Another object of the invention is to provide prestressed diaphragm assemblies suitable for use in pressure responsive devices such as pressure, vacuum, or differential pressure transmitters or gauges.

A further object of the invention is to provide a method stressed diaphragm assemblies which are biased toward a single neutral position, thereby eliminating buckling or the "oil can" effect.

Another object of the invention is to provide a method for prestressing diaphragms having the above characteristics.

A further object of the invention is to provide a method of prestressing diaphragms which upon repetition will produce substantially identical prestressed diaphragm assemblies.

Another object of the invention is to provide a method of efficiently mass-producing prestressed diaphragm assemblies having the above characteristics.

Other objects of the invention will in part be obvious and will in part appear hereinafter.

The invention accordingly comprises the several steps and the relation of one or more of such steps with respect to each of the others, and the article possessing the features, properties, and the relation of elements which are exemplified in the method and articles set forth in the following detailed disclosure. The scope of the invention is indicated in the claims.

A diaphragm that is to be prestressed is welded along its peripheral edge to a ring. This forms an upstanding closed flange which reinforces the diaphragm. Stressing the diaphragm is accomplished by forcing inside the flange a second ring with outside dimensions slightly larger than the unexpanded inside dimensions of the flange. The flange is thus expanded to a greater diameter or tensilely stressed. The tensile stress applied to the flange imparts a uniform tensile stress in the diaphragm.

The flange and the second, or expanding, ring not only maintain the diaphragm in a prestressed condition but are also advantageous in the easy installation and use of the assembly as a whole. The prestressed diaphragm assembly thus formed is ready for installation in any pressure sensitive device.

THE DRAWINGS

For a fuller understanding of the nature and objects of the invention, reference should be had to the following detailed description taken together with the accompanying drawings in which:

FIG. 1 is a cross-sectional view, taken along line 1—1 of FIG. 3, of a partially assembled prestressed diaphragm assembly according to my invention;

FIG. 2 is a cross-sectional view, taken along line 1—1 of FIG. 3, of the diaphragm assembly of FIG. 1 in assembled condition;

FIG. 3 is a top plan view of the diaphragm assembly of FIGS. 1 and 2;

FIG. 4 is a cross-sectional view, similar to FIG. 1, of a partially assembled alternative diaphragm assembly according to the invention;

FIG. 5 is a cross-sectional view, similar to FIG. 2, of an alternative diaphragm assembly according to the invention;

FIG. 6 is a cross-sectional view, similar to FIG. 2, of an alternative diaphragm assembly according to the invention;

FIG. 7 is a cross-sectional view, similar to FIG. 2, and partially cut away, of a modification of the diaphragm assembly shown in FIGS. 1, 2 and 3; and, FIG. 8 is a cross-sectional view, similar to FIG. 1, and partially cut away, of a modification of the diaphragm assembly shown in FIGS. 1, 2 and 3.

SPECIFIC DESCRIPTION

Specifically referring to FIGS. 1, 2 and 3 of the drawings, a diaphragm assembly according to the invention is generally indicated at 10. The entire peripheral edge of diaphragm 12 is seam welded at 14 to a pair of ring shaped flanges 20 and 22. The inner conical surfaces 21 and 23 of flanges 20 and 22 are beveled at an angle supplementary to the bevel angle of the outside surfaces 25 and 27 of rings 24 and 26. The bevels facilitate the insertion of rings 24 and 26 inside flanges 20 and 22, which, when unstressed, have inside diameters smaller than the outside diameters of rings 24 and 26, as indicated at A of FIG. 1.

In FIG. 2 the rings 24 and 26 have been fully inserted by pressing them toward each other into contact with the diaphragm 12 to form a prestressed diaphragm assembly. The insertion caused an increase in the diameter of the flanges 20 and 22, as indicated at B. The increase is also experienced by the diaphragm 12, which is thereby stressed. In this embodiment of the invention the inside edges of the inserted rings are circular, defining a disc shaped prestressed diaphragm surface.

The beveled edges 21 and 23 cooperate with the beveled edges 25 and 27 to form interference fits which hold rings 24 and 26 inside flanges 20 and 22 despite the compressive force exerted by the flanges tending to displace the rings outward from the diaphragm disc. The rings may be clamped together to insure such outward displacement does not occur, and clamping is desirable when the angle of bevel is greater than approximately ten degrees with the vertical. It may be convenient to do so when mounting the assembly for use in a pressure sensitive device.

Referring now to FIG. 3, several alternative constructions are shown by dotted lines. First, in place of seam weld 14, of FIGS. 1 and 2, the diaphragm can be spot welded to the outer flanges as indicated at 30 in FIG. 3. FIG. 3 also illustrates that the upstanding closed flanges 20 and 22 need not have circular outside diameters and may be shaped in any way convenient to facilitate installation, such as the square-shaped flange 34 shown in FIG. 3. Cylindrical openings 35 may be formed in the flange to receive mounting bolts or the like.

An alternative embodiment of the invention is shown in FIG. 4. Flanges 40 and 42 have inside surfaces 41 and 43 at right angles to the diaphragm 44. Expanding rings 46 and 48, shown partially inserted into assembled position, have circular cross-sections, the curvature of which facilitates insertion of the rings. When the assembly is completed by compressing the rings 46 and 48 into contact with the diaphragm disc 44, the disc is stressed and maintained in a stressed condition. This assembly is quite stable, as there are no forces tending to displace rings 46 and 48 away from the disc 44.

In FIG. 5 another alternative embodiment of the invention is shown. Flanges 50 and 52 have cross-sectional areas significantly smaller than corresponding flanges 20 and 22 of FIGS. 1 and 2, and expanding rings 56 and 58 have cross-sectional areas larger than those of rings 24 and 26 of FIGS. 1 and 2. It is understood that the flanges in the diaphragm assemblies such as is described herein exert a compressive force on the expanding rings. In the embodiment of FIG. 5, the amount of compressive force is minimized by constructing the assembly with the thin flanges 50 and 52. The expanding rings 56 and 58 are enlarged, thereby making them more resistant to such compressive forces, and contributing the strength and rigidity of the entire apparatus. This embodiment is desirable to achieve maximum stressing of the diaphragm 54.

The diaphragm assembly shown in FIG. 6 is identical to that of FIGS. 1, 2 and 3, except that the lower flange and ring have been eliminated. This is a less expensive assembly embodying the same principle of an expanded outside supporting flange prestressing the diaphragm. There is some loss of rigidity and stressing force in an assembly constructed in this manner; however, its simplicity and lower cost may make it desirable for some applications.

In FIG. 7, a modified diaphragm assembly 69, similar to assembly 10 of FIGS. 1, 2 and 3, comprises beveled facing surfaces 77 and 79 on expanding rings 76 and 78. These bevels 77 and 79 serve to clamp diaphragm 73 along the innermost diameter of the stressing rings at sharp knife-like edges 80 and 82. Thus, only the surface of the diaphragm 73 inside the perimeter of the inside rings will be exposed to pressure and be free to respond thereto. That is, the peripheral edge at which the diaphragm 73 flexes is exactly defined.

A similar effect may also be accomplished by spot welding the prestressed diaphragm to the expanding ring near the inside diameter as indicated at 57 and 59 of FIG. 5 and 28 of FIG. 6. Such spot welding also insures that the expanding ring will not become separated from the diaphragm.

It is desirable in some applications to seal the periphery of the diaphragm against leakage. The assembly shown in FIG. 8 provides O-ring seals 106 and 108 in annular seal-receiving grooves 101 and 103. When the assembly is completed by pressing expanding rings 96 and 98 toward each other into contact with the diaphragm 84, the seals 106 and 108 are pressed tightly against the diaphragm and prevent leakage through the interference fits between surfaces 91 and 97, and 93 and 99.

The flanges 100 and 102, which form the inside walls of the seal-receiving grooves 101 and 103, protrude from expanding rings 96 and 98 toward the diaphragms 84 as indicated at D and E. In the completed assembly, the protruding flanges clamp the diaphragm in a manner similar to the knife edges 80 and 82 in the assembly shown in FIG. 7. The clamping defines exactly the dimensions and periphery of the surface of diaphragm 84 that will be exposed to pressure.

The method of prestressing diaphragms by tensilely stressing a supporting flange welded thereon and the assemblies resulting therefrom described above are characterized by the use of a minimum number of uncomplicated components. This makes the method suitable for producing the assemblies in large quantities with substantial uniformity in the assemblies so produced. The assemblies may be constructed of steel, brass or other suitable material for the particular instruments in which they are to be used. It will be understood that a transducer is employed in many of these instruments suitably coupled to monitor movement of the central portion of the diaphragm.

It will be further understood that the principles of the invention are applicable to stressing any planar material in a manner similar to a prestressed diaphragm described above, including as an example stretching pellicles for use as beam splitters or optically flat mirrors such as those sold by The National Photocolor Corp., South Norwalk, Conn. It may also be desirable for some applications to combine in the same diaphragm assembly expanding rings of a hard material with flanges of another softer material.

It will thus be seen that the objects set forth above, among those made apparent from the preceding description, are efficiently attained and, since certain changes may be made in the disclosed methods and articles without departing from the scope of the invention, it is intended that all matter contained in this description or shown in the accompanying drawings shall be interpreted as illustrative and not in a limting sense.

Having described my invention, what I claim as new and wish to secure by Letters Patent is:

1. A prestressed diaphragm assembly comprising:
   (A) a diaphragm;
   (B) at least two opposed flanges attached to said diaphragm; and,
   (C) a flange engaging part engaged with said flanges and having a flange engaging dimension slightly different than a dimension between said flanges whereby said flanges are moved from their normal position to tensionally prestress a portion of said diaphragm.

2. A prestressed diaphragm assembly as defined in claim 1, wherein said flanges form a substantially closed ring.

3. A prestressed diaphragm assembly as defined in claim 2, wherein said flange engaging part is a second ring having an outside diameter slightly greater than the inside diameter of said first ring.

4. A prestressed diaphragm assembly as defined in claim 3, wherein the inside surface of said first ring and the outside surface of said second ring form cones beveled at supplementary angles.

5. A prestressed diaphragm assembly as defined in claim 3, wherein said second ring comprises an annular knife-like edge and said edge is the only portion of said second ring in contact with said diaphragm.

6. A prestressed diaphragm assembly as defined in claim 3, wherein said second ring is secured to the prestressed diaphragm.

7. A prestressed diaphragm assembly as defined in claim 3, wherein said rings, as defined in claim 3, are duplicated on both sides of the diaphragm.

8. The method of prestressing a diaphragm comprising the steps of:
   (A) securing opposed flanges to the diaphragm; and thereafter,
   (B) permanently changing the dimension between the flanges to thereby tensionally prestress an area of the diaphragm, wherein the flanges form a substantially closed ring and said dimension changing is effected by engaging a second ring with the first ring.

9. The method defined in claim 8, wherein the second ring is inserted inside the first ring.

10. A method of prestressing diaphragms comprising the steps of:
   (A) securing to a diaphragm a first ring forming a substantially closed flange thereon; and thereafter,
   (B) inserting into the flange a second ring having outside dimensions greater than the corresponding inside dimensions of the closed flange thereby expanding the flange and prestressing the diaphragm.

11. The method of prestressing a diaphragm comprising the steps of:
   (A) securing opposed flanges to the diaphragm; and thereafter,
   (B) permanently changing the dimension between the flanges to thereby tensionally prestress an area of the diaphragm, wherein said last named step is performed by inserting a part between said flanges which has a larger dimension than the dimension between said flanges.

References Cited

UNITED STATES PATENTS

| | | | |
|---|---|---|---|
| 2,438,916 | 4/1948 | Havstad | 29—448 |
| 2,738,073 | 3/1956 | Jepson | 29—448 |

MARTIN P. SCHWADRON, Primary Examiner

B. GROSSMAN, Assistant Examiner